June 14, 1960   C. G. PETERSON   2,940,482
BAG FILLING AND HANDLING MEANS
Filed March 2, 1956
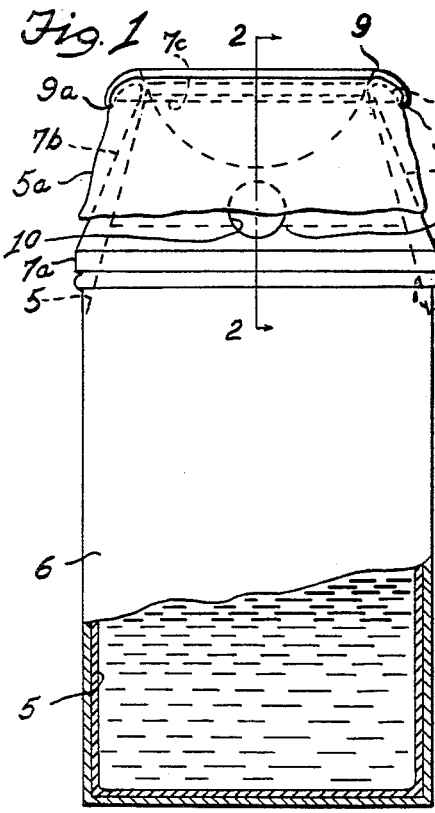
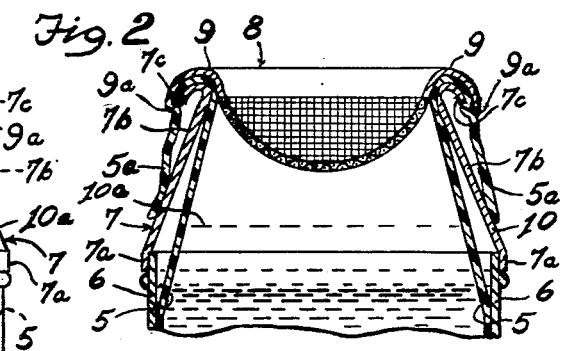
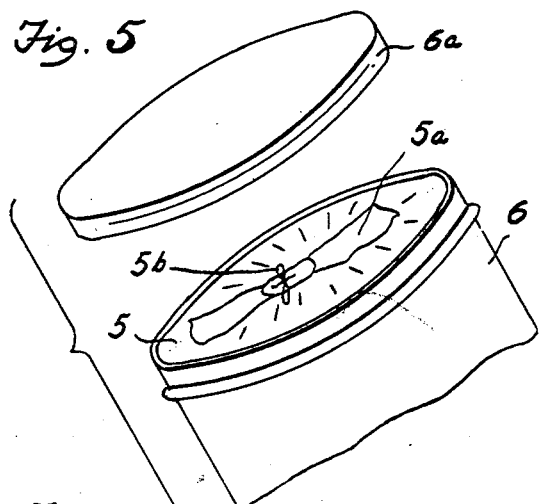
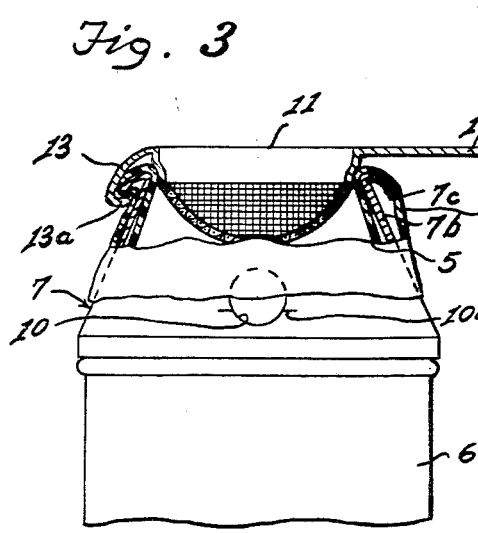
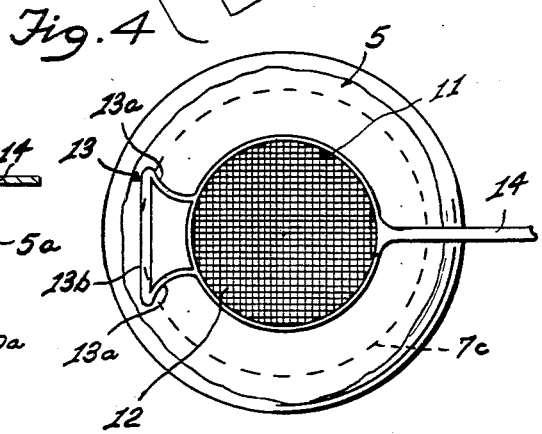
INVENTOR.
C. G. Peterson
BY
ATTORNEYS

United States Patent Office 2,940,482
Patented June 14, 1960

2,940,482
BAG FILLING AND HANDLING MEANS

Clarence G. Peterson, 710 N. Center Ave., Galva, Ill.

Filed Mar. 2, 1956, Ser. No. 569,201

9 Claims. (Cl. 141—95)

My invention relates to improvements in the handling, packaging, storage and transportation of liquids generally but has particular application to the dairy industry and the handling of cream in bulk from the time it leaves the separator in the dairy farmer's milking house, through the stages of subsequent storage, shipment and delivery to his customer, for instance, a city creamery or dairy company. Reference is made to my copending application Serial No. 559,636, filed January 17, 1956 (now abandoned), dealing with related subject matter.

According to standard dairy industry practice, cream from the dairyman's or creamery company's separator is delivered to a pail or other container, is subsequently poured into crocks, pans or the like for cooling in a refrigerator, and is thereafter transferred to the conventional heavy metal cream cans for shipment by rail, truck or otherwise, to the city creamery or dairy company.

Under the above noted procedure proper sanitation is a serious problem, not only because the product is exposed to foreign matter from the atmosphere until the sealed can shipment stage, but also because it is impossible to be sure that the cans, crocks and pans, etc., will be sterile when the cream is received therein. The shipment cans present a special problem because they become internally pitted by rust or otherwise scarred, making it almost impossible to keep them bacteria-free.

Then, too, present creamery practice is unnecessarily expensive in material, labor and shipping costs. The pails, pans, crocks and cans not only are expensive but it is a time-consuming job to keep them even inadequately clean.

Also, the transfer of the cream from one container to another in the various handling stages adds to the labor bill. Other cost factors are the weight of the heavy metal shipment cans and the necessity for returning the empties to the producer from the city creamery or dairy.

My invention therefore has for its primary object to overcome the aforenoted objections to the present cream handling method involving the use of different containers at various stages from the separator to the bulk buying customer, and provides a novel handling procedure and apparatus which entails the use of a single container in the form of a preferably plastic bag which receives the cream from the separator, serves to told it while being refrigerated, or stored, and subsequently in transit to such customer.

My development in the art, as will be appreciated, eliminates the necessity for cleaning a separator-supported cream-receiving pail, cooling crocks or pans, and the shipping cans. At the same time such improved practice solves the sanitation problem as the bags can be readily rendered absolutely sterile both initially and after use; and the cream is never exposed to the atmosphere from the time a bag is filled and sealed at the separator until delivery to the customer's plant.

Additionally, the invention contemplates novel separator-shelf supported bag holder means for maintaining a bag in upright position with its mouth open to receive cream from the separator discharge spout, and one element of which holder means comprises an open topped individual bag-receiving receptacle which serves as such during subsequent refrigeration and storage. Closures are provided for the containers, so that the latter can be used for shipping purposes if desired. However, ordinarily a predetermined number of filled bags are packed in a single carton or the like for shipping.

Also included in the bag holder phase of the invention is a novel collar-like shape former and retainer for the mouth region of the bag while it is being filled from the separator spout, this shape former being supported by the bag receptacle. Associated with the shape former is a cooperating cream strainer which has the further function of securely retaining the mouth region of the bag in place. It is also to be noted that the shape former will have a sight opening or will be of transparent material so that at least the final stages of the bag filling can be observed and the inflow of cream cut-off when the bag has been filled to a predetermined height.

A further object of the invention is to provide a member of the bag holder means, such as the aforementioned receptacle, which will sustain the bag adjacent the mouth region after filling and while it is being tied closed or sealed. This is important as the plastic or other bag material is highly flexible and hard to hold onto.

Various other objects and advantages of the invention will be readily understood and apreciated by those versed in the creamery business upon reference to the accompanying drawing in connection with the detailed description thereof appearing hereinafter.

It is to be understood that while the drawing illustrates certain now prefered means and apparatus for carrying out my novel process, it is to be considered as illustrative rather than limitative, because various changes and modifications may be made therein within the spirit and scope of the subject matter claimed hereinafter.

In the drawing, wherein the same reference characters have been used to designate the same parts throughout the several views—

Fig. 1 is an elevational view partly broken and partly in section illustrating a plastic or other bag supported by a container-incorporating holder ready to be filled from the separator, there being also incorporated in the holder a separable bag mouth supporting annulus and an associated strainer;

Fig. 2 is a sectional view taken on the line 2—2 of Fig. 1;

Fig. 3 is a fragmentary elevational view of the assembly of Figs. 1 and 2, but showing a modified form of strainer-incorporating clamp;

Fig. 4 is a top plan view of the modification disclosed in Fig. 3; and

Fig. 5 is a group perspective view showing the receptacle closure and the upper end of the receptacle with a sealed cream-filled bag therein ready for refrigeration or storage.

Referring to the drawing by reference characters, numeral 5 designates the cream receiving bag which is preferably of polyethylene, a variety of transparent or transluscent plastic, although other materials which are impervious to fluids may be used.

To support the bag 5 while it is being filled from a separator spout (not shown), I provide a holding means which comprises the open topped container 6 which receives the major portion of the bag 5 leaving the upper bag end to extend thereabove. The upper end of container 6 removably supports a bag mouth shaper in the form of a frustroconical collar or annulus 7 having the flanged lower end 7a which makes a friction fit about the container wall. From flange 7a the annular wall 7b of member 7 slopes inwardly toward its upper end which terminates in the circumferential outwardly turned and downwardly curved lip 7c. As shown in Figs. 1 and 2, the upper bag end 5, after being passed through collar 7 is turned down over lip 7c to extend therebelow.

To clamp the downturned lip-overlying portion 5a of the bag to the collar lip 7c, I employ the clamp means-incorporating strainer which is generally indicated by reference character 8, and which provides the annulus 9 to which is secured the upper end of the semi-spherical mesh unit. The mesh-carrying annulus 9 is of springy material and is concaved in cross-section; and its outer margin is so curved as to firmly clamp the underlying bag portion against the lip 7c of the member 7.

When assembling the bag 5 with container 6 and the strainer-incorporating clamp collar 7, the upper end of the bag is first pulled through the collar 7 so that its upper portion 5a will drop down, as aforementioned, to overlie the collar wall 7b. The length of the depending bag portion 5a should be sufficient to admit of subsequent gathering together of the bag walls and tying above the liquid level; and also to dispose the bottom of the bag at about the bottom of the container 6 when the latter is assembled with member 7 and the bag, as shown in Fig. 1.

The frustroconical bag mouth supporting collar 7 may be of transparent plastic, metal, or other material. However, when transparent plastic is used the final stages of the filling of the transparent or translucent bag 5 can be observed through the wall 7b so that the inflow of cream can be cut off at the proper time. When the bag mouth supporting collar 7 is made of non-transparent material such as metal, a sight opening 10 is provided so that the final stages of filling can be observed and a timely inflow cut off made.

An important feature to be noted in connection with the container or receptacle 6 is that it greatly facilitates tying of the bag mouth closed after the bag has been filled and the clamp means-incorporating strainer 8 removed. The material of which bag 5 is made is very flexible and polyethylene plastic especially so. Thus, without the sustaining support of the receptacle 6 adjacent the upper end of a filled bag, it would be difficult to gather together the wall area 5a above the liquid level and tie or otherwise clamp the bag closed.

After the bag 5 has been filled and tied or otherwise closed, as indicated at 5b in Fig. 5, the receptacle closure 6a of Fig. 5 may be applied; or the tops of the containers 6 can be left open while they and the contained cream-filled bags are subjected to the refrigerating step to bring the temperature of the cream down to a predetermined degree prior to shipment.

Figs. 3 and 4 disclose a modified form of clamp incorporating strainer for use in lieu of the corresponding unit 8 which is shown in Figs. 1 and 2. Thus, in Figs. 3 and 4 the bag-retaining strainer unit comprises the circular and preferably spring metal band 11 of considerable depth to which the upper margin of the strainer mesh 12 is secured. This mesh-carrying band 11 is adapted to frictionally fit into the open upper end of the bag mouth-supporting shaper or retaining collar 7 so as to clamp the intervening bag portion against the latter.

As herein illustrated, the strainer carrying band 11 provides the laterally extending and functionally integral yoke 13 and lever form handle 14 at opposite sides. It is to be noted that the yoke legs 13a are so bent that they cooperate with the bight 13b to give the outer end of yoke 13 a hook form as viewed in side elevation and indicated in Fig. 3. Thus, the depending bight-provided hook bill 13b is adapted to impinge against the underlying part of bag portion 5a and retain it in substantial frictional engagement with the under surface of the adjacent lip 7c of the collar 7 when lever 14 is swung down to project the strainer into collar 7.

It is to be understood that the hook portion 13a, 13b of yoke 13 will serve to secure bag portion 5a against noticeable shifting relatively of collar 7 regardless of whether strainer band 11 makes a friction fit in the upper end of collar 7 or not. Also, the yoke 13 and handle form lever 14 can be dispensed with if desired; but these elements facilitate application and removal of the strainer unit and obviate the necessity for finger contact with the strainer, per se.

As will be appreciated, the bag holding receptacle 6, with or without its closure 6a, facilitates necessary handling of the filled bags incident to the refrigeration step and subsequent storage. Ordinarily the filled bags will be removed from containers 6 prior to shipment and packed in predetermined numbers in a single shipping container. The shipping containers will preferably be a well know form of corrugated fibre box which provides insulation to a considerable degree.

Thus it will be appreciated that I eliminate the necessity for a separator shelf carried cream pail, the subsequent use of crocks or pans for cooling the cream, and finally the conventional heavy cans which are used for shipment to the purchaser and which have to be returned. But more important, the use of the bags 5 makes it possible to prevent exposure of the cream to the atmosphere from the time it comes from the separator until the cream bag is opened by the customer. Also, the problem of keeping pails, pans and cans as heretofore used bacteria free is solved. The bags 5 themselves, if desired, can be readily cleaned and returned by mail to the shipper and at small cost because of their light weight.

It should further be noted that the transparency of the collar 7, or the sight opening 10 therein, makes it possible to fill all bags uniformly. Thus, when the liquid reaches the graduation 10a on the shaper, or collar 7 (Figs. 1 and 3) the cream flow will be cut off. Although graduation 10a, and hence the cream cut off level, is above the plane of the top of container 6 the cream level will drop to the plane of the top of container 6 when the strainer and collar 7 are removed. This is so because, as shown in Fig. 2, the strainer 8 cooperating with the upper end of collar 7 maintains the subjacent bag walls in spaced relationship to the surrounding collar wall; and also spaced from the upper end of the surrounding wall of container 6. But when strainer 8 (or 11, 12) and collar member 7 are removed, the weight and resultant lateral force of the liquid above the top of container 6 will cause uniform bag wall-engagement with the surrounding container wall so as to lower the liquid level as stated.

It will be apparent from an inspection of Figs. 2 and 3 that the space between the drawn-in upper portion of bag 5 and the interior of the shaper 7 and upper end of container 6 provides space for air that is expelled from between the container wall and bag 5 as the latter is filled. This is important when shaper 7 is of transparent material and sight opening 10 is omitted.

Having thus described my invention, what I claim is:

1. In a filling facilitating means for a flowable material-receiving shipping package which latter comprises an open topped container and a flexible and open topped material-receiving bag of light-transmitting material removably supported within said container as a liner therefor, the height of the bag exceeding that of the container and the bag providing a mouth disposed substantially above the plane of the open upper end of the container, a collar member providing an upper end opening which is smaller than its lower end opening and having its lower end seated on said open container end, the upper portion of the bag above said container being passed through the reduced upper collar member end whereby the latter functions to draw the bag walls away from the surrounding container wall commencing at a point adjacent and below the container top, clamp means securing upper bag portions to the reduced upper collar end so as to retain the aforementioned spacement between the upper bag portion and said container wall portions during the filling operation, and said collar having a filling observation permitting area above the plane of the container top whereby a substantially horizontal plane view of the level of material in the bag may be had after said level passes the top of the container so that the flow of material to the bag may be cut off when it reaches such a predetermined level above the container top that when the collar and clamp means have been removed and the weight of material forces the upper bag portion against the upper container wall surfaces, the material level in the bag will be at or below the plane of the container top so as to facilitate closing of the bag and the application of a closure to the container.

2. The structure of claim 1, the upper end of said collar having an endless outwardly and downwardly extending lip, and portions of said clamp means engaging bag portions against lower edge portions of said lip.

3. The structure of claim 1, and the upper end of said collar having an endless outwardly and downwardly extending lip, said clamp means providing a frame-like portion contiguously fitting into the upper end of said collar to compress bag portions thereagainst, a lever-like laterally extending handle carried by said clamp means, and a downwardly extending hook-form portion provided by said clamp means at the portion of same opposite said handle, said hook means being engageable against the lower edge of said lip, whereby to enable said handle to function as a lever in actuating said frame-like clamp means portion to its operative bag-retaining position.

4. A holder and uniform filling facilitating means for flowable material-receiving bags of light transmitting material and comprising a tubeform bag mouth area shaper and a rigid open topped receptacle form container for the lower portion of the bag, the mouth area shaper having a lower end approximating container top dimensions and removably supported by the container top and providing a reduced upper end, the upper end of the bag being inserted through said shaper and turned down over at least the upper exterior portion thereof whereby to draw upper bag wall portions away from surrounding container walls so that material will flow into the shaper-enclosed bag portion, removable clamp means securing the bag to the upper end of the shaper, and said shaper having means whereby at least the final stages of the bag filling can be observed the material flow can be cut off when it reaches a predetermined level in the bag.

5. The structure of claim 4, and said clamp means having a portion overlying the upper end of the bag and shaper whereby to provide the bag with a filling opening of constant shape.

6. A holder for bags while being filled and comprising a tubiform bag mouth area shaper and a rigid open topped receptacle form container of a height less than bag length and receiving the lower portion of the bag, the mouth area shaper being removably supported by the container top and its upper end having an endless outwardly and downwardly extending lip, the upper end of the bag being inserted through said shaper and turned down to terminate below said lip, removable clamp means securing the bag to the upper end of the shaper, said clamp means providing a frame-like portion contiguously fitting into the upper end of said shaper to compress opposed bag portions thereagainst, a lever-like laterally extending handle carried by said clamp means, and a downwardly extending hook-form portion provided by said clamp means at the portion of same opposite said handle, said hook means being engageable against the lower edge of said lip, whereby to enable said handle to function as a lever in actuating said frame-like clamp means portion to its operative bag-retaining position.

7. A uniform filling-facilitating means for flowable material-receiving bags of light-transmitting material, comprising a container having an open and tubiform top and being of a height less than the height of the bag to be filled, a bag mouth shaper which is tubiform at its lower end and provides a reduced opening at its upper end, the tubiform end of said shaper substantially conforming in size to open upper end of the container and removably seatable thereon, the upper portion of the bag adapted to be drawn through said shaper and turned down upon the exterior upper portion thereof whereby to draw opposed bag walls away from the surrounding upper portions of the container walls, means for clamping the upper end of the bag to the upper end of the shaper whereby to provide a filling mouth for the bag and to sustain it against shifting in respect to the container and shaper during the filling operation, and a flow cutoff indicating means provided by the shaper so that the flow of material can be cut off in each instance at the same time to assure of uniform filling of the bags, whereby when the clamping means is released the level of the flowable material in the bag will drop to a point adjacent the plane of the container top and force the bag walls into supported engagement with the surrounding container walls so that the upper end of the container-supported bag can be conveniently sealed upon removal of the shaper.

8. The structure of claim 7 and the shaper having an endless outwardly and downwardly extending lip, and portions of said clamp means engaging bag portions against lower edge portions of said lip.

9. The structure of claim 7 and the shaper having an endless outwardly and downwardly extending lip, said clamp means providing a frame-like portion contiguously fitting into the upper end of said collar to compress bag portions thereagainst, a lever-like laterally extending handle carried by said clamp means, and a downwardly extending hook-form portion provided by said clamp means at the portion of same opposite said handle, said hook means being engageable against the lower edge of said lip, whereby to enable said handle to function as a lever in actuating said frame-like clamp means portion to its operative bag-retaining position.

References Cited in the file of this patent

UNITED STATES PATENTS

| | | |
|---|---|---|
| 156,506 | Smith | Nov. 3, 1874 |
| 1,265,996 | Cerny | May 14, 1918 |
| 1,668,053 | Dawson | May 1, 1928 |
| 1,953,042 | Cody | Mar. 27, 1934 |
| 2,678,764 | Carlson | May 18, 1954 |
| 2,769,578 | Johnson | Nov. 6, 1956 |